United States Patent
Mieszkowski

(10) Patent No.: US 12,417,247 B2
(45) Date of Patent: Sep. 16, 2025

(54) SYSTEMS AND METHODS FOR METADATA BASED PATH FINDING

(71) Applicant: DataWalk Spólka Akcyjna, Wroclaw (PL)

(72) Inventor: Mateusz Mieszkowski, Domaszczyn (PL)

(73) Assignee: DataWalk Spólka Akcyjna, Wroclaw (PL)

( * ) Notice: Subject to any disclaimer, the term of this patent is extended or adjusted under 35 U.S.C. 154(b) by 0 days.

(21) Appl. No.: 18/232,913

(22) Filed: Aug. 11, 2023

(65) Prior Publication Data
US 2023/0385337 A1    Nov. 30, 2023

Related U.S. Application Data

(63) Continuation of application No. PCT/EP2022/053717, filed on Feb. 16, 2022.

(60) Provisional application No. 63/150,461, filed on Feb. 17, 2021.

(51) Int. Cl.
G06F 16/90    (2019.01)
G06F 16/901    (2019.01)

(52) U.S. Cl.
CPC ................. G06F 16/9024 (2019.01)

(58) Field of Classification Search
None
See application file for complete search history.

(56) References Cited

U.S. PATENT DOCUMENTS

| | | | |
|---|---|---|---|
| 8,145,677 B2 | 3/2012 | Al-Shameri | |
| 8,244,662 B2 | 8/2012 | Coury et al. | |
| 9,245,038 B2 | 1/2016 | Lee et al. | |
| 9,697,254 B2 | 7/2017 | Paradies et al. | |
| 2004/0248576 A1* | 12/2004 | Ghiglino | G06F 16/90 |
| 2013/0173632 A1 | 7/2013 | Birdwell et al. | |
| 2016/0203327 A1* | 7/2016 | Akkiraju | G06F 16/9024 |
| | | | 707/785 |
| 2017/0221240 A1 | 8/2017 | Stetson et al. | |
| 2020/0342029 A1 | 10/2020 | Piecko | |

(Continued)

FOREIGN PATENT DOCUMENTS

| | | |
|---|---|---|
| EP | 2743845 B1 | 4/2020 |
| WO | WO-2022175288 A1 | 8/2022 |

OTHER PUBLICATIONS

Paradies et al. GRAPHITE: An Extensible Graph Traversal Framework for Relational Database Management Systems. Proceedings of the 2015 XSEDE Conference: Scientific Advancements Enabled by Enhanced Cyberinfrastructure. Jun. 29, 2015. 12 pages.

(Continued)

*Primary Examiner* — Son T Hoang
(74) *Attorney, Agent, or Firm* — Wilson Sonsini Goodrich & Rosati

(57) ABSTRACT

A computer-implemented method for traversing a graph comprising: generating a metadata graph by reducing the graph, wherein the metadata graph is generated based on metadata describing one or more vertices and one or more edges of the graph. The metadata graph can comprise one or more edge types and one or more reduced vertices. Edge types in the metadata graph can be filtered to optimize finding of a path between a source vertex and a target vertex within a predetermined maximum path length.

20 Claims, 14 Drawing Sheets

(56) References Cited

U.S. PATENT DOCUMENTS

2021/0149851 A1\* 5/2021 Belezko .............. G06F 16/9024
2023/0244719 A1\* 8/2023 Taffe ................... G06F 16/2291
                                                              707/798
2024/0330369 A1\* 10/2024 Zheng ................ G06F 16/9024

OTHER PUBLICATIONS

PCT/EP2022/053717 International Search Report and Written Opinion dated Jun. 21, 2022.
Jindal et al. Vertexica: Your Relational Friend for Graph Analytics! Proceedings of the VLDB Endowment, vol. 7, Issue 13, pp. 1669-1672. Year: 2014.

\* cited by examiner

|   | A | B | C | D | E | F |
|---|---|---|---|---|---|---|
| A | 2 | 2 | 1 | 2 | 3 | 3 |
| B | 2 | 2 | 1 | 2 | 3 | 3 |
| C | 1 | 1 | 2 | 1 | 2 | 2 |
| D | 2 | 2 | 1 | 2 | 1 | 1 |
| E | 3 | 3 | 2 | 1 | 2 | 2 |
| F | 3 | 3 | 2 | 1 | 2 | 2 |

FIG. 5

SYSTEMS AND METHODS FOR METADATA BASED PATH FINDING

CROSS-REFERENCE

This application is a continuation application of International Application No. PCT/EP2022/053717, filed Feb. 16, 2022, which claims priority to U.S. Provisional Patent Application No. 63/150,461, filed Feb. 17, 2021, which application is entirely incorporated herein by reference.

BACKGROUND

Graph theory has wide applications in areas such as data mining, image segmentation, clustering, image capturing, networking, sociology, network topologies, games, transport network, activity networks, operations research, route planning, resource allocation, scheduling, database design, and the like. For example, a data structure may be designed in the form of a graph or tree including vertices and edges. There are a number of graph algorithms used to solve problems that are modeled in the form of graphs. Examples of graph algorithms may include algorithms to find graph planarity, shortest path algorithms in a network, algorithms to find a minimum spanning tree, algorithms to find adjacency matrices, algorithms to find the connectedness, algorithms to find cycles in a graph, algorithms for searching an element in a data structure (e.g., DFS, BFS), and various others. However, algorithms that find all the paths from a source to a destination (e.g., find path algorithm) can face a difficult problem as there can be an exponential number of simple path permutations connecting the source and destination.

SUMMARY

Recognized herein is a need to simplify or reduce a graph for executing a find path algorithm, thereby reducing computation time and saving other resources. The present disclosure provides methods and systems for improving a graph search algorithm using metadata. In particular, a reduced graph is generated using metadata of the original graph.

In an aspect, provided herein is a computer-implemented method for traversing a graph comprising: (a) receiving a request to traverse the graph from a source vertex to a target vertex; (b) generating a metadata graph for reducing the graph, where the metadata graph comprises a plurality of reduced vertices each representing a data set that one or more vertices from the graph belong to, where a first vertex from the plurality of reduced vertices represents a first data set the source vertex belongs to and a second vertex from the plurality of reduced vertices represents a second data set the target vertex belongs to; (c) in the metadata graph, identifying one or more edge types that connect the first vertex to one or more reduced vertices; and (d) in the graph, determining whether one or more vertices in the data sets represented by the one or more reduced vertices identified in (c) intersect with the target vertex.

In some embodiments, a target reduced vertex from the plurality of reduced vertices represents a data set that the target vertex belongs to. In some cases, identifying the one or more edge types comprises identifying the one or more neighbor reduced vertices from the plurality of reduced vertices based at least in part on a distance between each of the one or more reduced vertices and the target reduced vertex. In some instances, the distance between each of the one or more reduced vertices and the target reduced vertex is not greater than a predetermined distance.

In some embodiments, the method further comprises upon determining at least one of the one or more vertices intersects with the target vertex in the graph, save one or more paths corresponding to the at least one vertex as part of the traverse result. In some embodiments, the method further comprises setting at least one of the one or more vertices as the source vertex upon determining that the at least one vertex does not intersect with the target vertex. In some embodiments, the method further comprises updating the metadata graph and repeating (c)-(d). In some cases, the method further comprises updating the metadata graph, reducing the predetermined distance, and iterating (c)-(d) until the predetermined distance is reduced to zero. In some instances, updating the metadata graph comprises updating the source reduced vertex or the target reduced vertex. For example, the source reduced vertex and the target reduced vertex are updated substantially simultaneously or in an alternating fashion.

In some embodiments, the metadata graph is generated based at least in part on metadata describing a plurality of data objects represented by a plurality of vertices in the graph and one or more data sets that the plurality of data objects belong to. In some cases, the metadata further describes the one or more edge types. For instance, each edge type defines a relation between two data sets. In some cases, the metadata comprises entity class, relation between entity classes, or attributes of entity class stored in defined fixed data structures.

In another aspect, provided herein is a computer-implemented method for traversing a graph comprising: (a) generating a metadata graph by reducing the graph, the metadata graph is generated based on metadata describing one or more vertices and one or more edges of the graph, and the metadata graph comprises one or more edge types and one or more reduced vertices; (b) calculating a length for one or more paths between the one or more reduced vertices of the metadata graph; (c) filtering the one or more edge types of the metadata graph based on a source vertex, a target vertex, and a predetermined maximum length, to generate one or more filtered edge types connecting a source reduced vertex, containing the source vertex, to one or more neighbor reduced vertices, where a path length from each of the one or more neighbor reduced vertices of the one or more filtered edge types to a target reduced vertex, containing the target vertex, is no greater than the predetermined maximum length; (d) identifying one or more vertices, if any, of the one or more neighbor reduced vertices identified in (c) intersecting with the target vertex; (e) decreasing the predetermined maximum length and repeating (c) and (d) until the maximum length is equal to zero; and (f) returning path(s) from the source vertex to the target vertex, wherein the path(s) comprises a sequence of the one or more vertices identified in (c)-(e).

In some embodiments, the one or more vertices represent data objects, and wherein the data objects are stored in defined fixed data structures.

In some embodiments, the metadata includes an edge type of the one or more edge types and a data set that a vertex of the one or more vertices belongs to.

In some embodiments, a reduced vertex of the one or more reduced vertices in the metadata graph represents a data set that a vertex of the one or more vertices in the graph belongs to.

In some embodiments, the edge type defines a relation between two data sets. In some embodiments, the metadata comprises entity class, relation between entity classes, or attributes of entity class stored in the defined fixed data structures.

Another aspect of the present disclosure provides a non-transitory computer-readable medium comprising machine-executable code that, upon execution by one or more computer processors, implements any of the methods described above or elsewhere herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods described above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGS." herein).

FIG. 5 shows an example of the lengths of all the different paths in the metadata graph.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Find Path Algorithm

Systems and methods of the present disclosure provide a metadata-based find path algorithm. The provided find path algorithm is improved using metadata information. For example, metadata may be utilized to determine which paths to exclude from further calculations, which may greatly reduce processing time and improve processing efficiency. Metadata information may describe the vertices and/or edges in the graph. For example, the metadata information may include entity classes (e.g., vertices), and/or relations between entity classes (e.g., edge). Details about the metadata and data structures for storing the metadata are described elsewhere herein.

Figure 1:
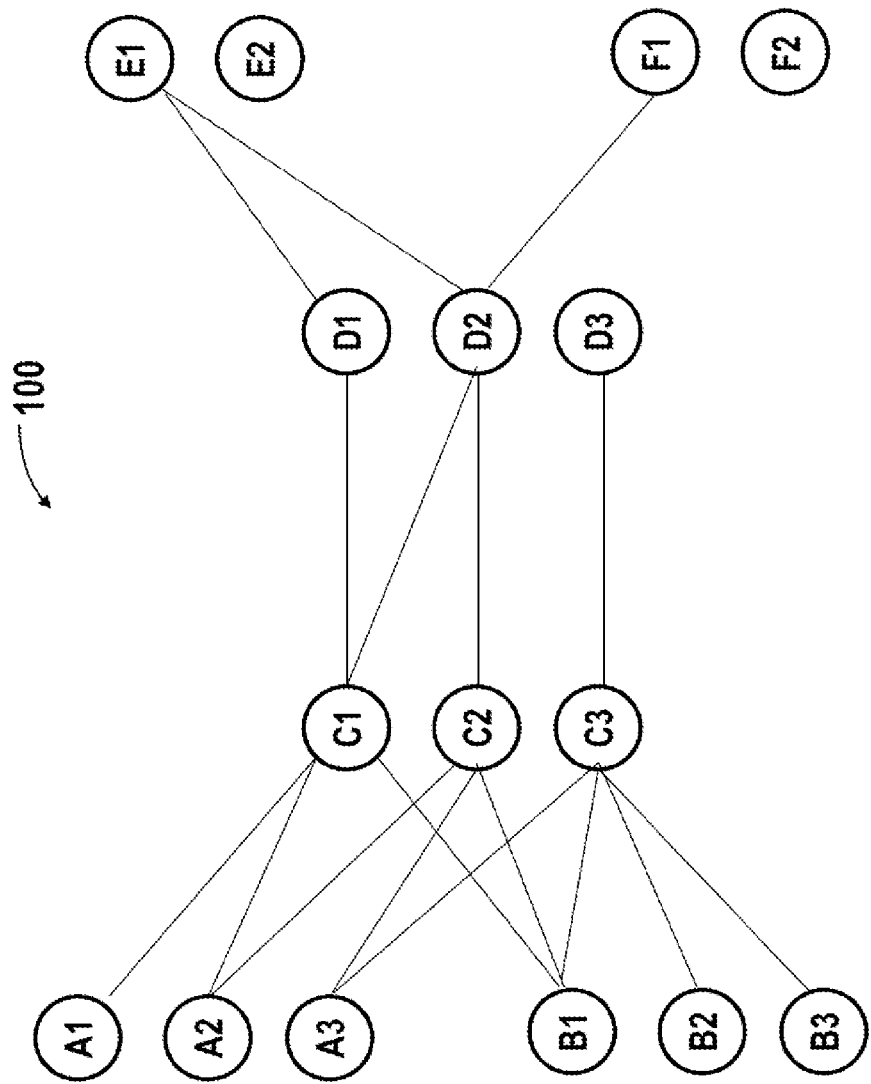
FIG. 1 illustrates a graph to be traversed by a conventional find path algorithm.

A find path algorithm may include an operation to find all paths in a graph G between two or more vertices. The find path result may include a subgraph of G. FIG. 1 illustrates a graph 100 to be traversed according to the conventional find path algorithm.

The find path algorithm may find all paths between two or more vertices such as C1 and E1. As used herein, the term "path" may generally refer to a sequence of graph edges connecting distinct vertices. The path may be a sequence of graph edges from a source (e.g., source vertex or source group of vertices) to a destination (e.g., destination vertex or destination group of vertices). There may exist one or multiple paths from a source to a destination. As used herein, the term "path length" may generally refer to the number of edges in a given path from the source to the destination. As used herein, the term "neighbor" with respect to a given vertex may refer to the vertice(s) connected to the given vertex with a single edge (e.g., first degree connection). As used herein, the term "traverse" with respect to a graph may generally refer to moving from a vertex or group of vertices to the neighbor(s) of the vertex or group of vertices. The conventional find path algorithm may include finding all the paths from the source to the destination (also referred to herein as the target (e.g., target vertex or target group of vertices)) when the maximum length is defined. The maximum path length may include, for example, a number of the edges at which the algorithm stops finding paths, when all the paths with respective lengths that are no more than the maximum length have been verified and/or found.

As an example, the conventional find path algorithm may include:
1. Start with Source (e.g., C1)
2. Traverse from Source to all neighbors (e.g., A1, A2, B1, D1, D2)
3. Intersect neighbors and Target—save paths for intersection result (e.g., save paths from the source node to the one or more neighbors intersect with the targets and add it to the intersection result)
4. Set MAX=MAX−1
5. until MAX=0, set neighbors (e.g., un-intersected neighbors) as Source; repeat steps 2-5
6. Return saved paths (subgraph)

The term "intersect" as utilized above, may generally refer to finding vertices in the neighbors that are also the Target. In the context of intersecting two sets of elements (e.g., set A and set B), intersection may refer to a set containing all the vertices that belong to both set A and also set B.

In some cases, the data elements may be stored in a relational database. For example, there are at least two sets of elements and at least one relation that define how elements from a first set are related to elements of a second set. The relation may be defined in a data structure that maps elements of the first set to elements of the second set. The relation may be represented as edges in the graph.

Figure 2:
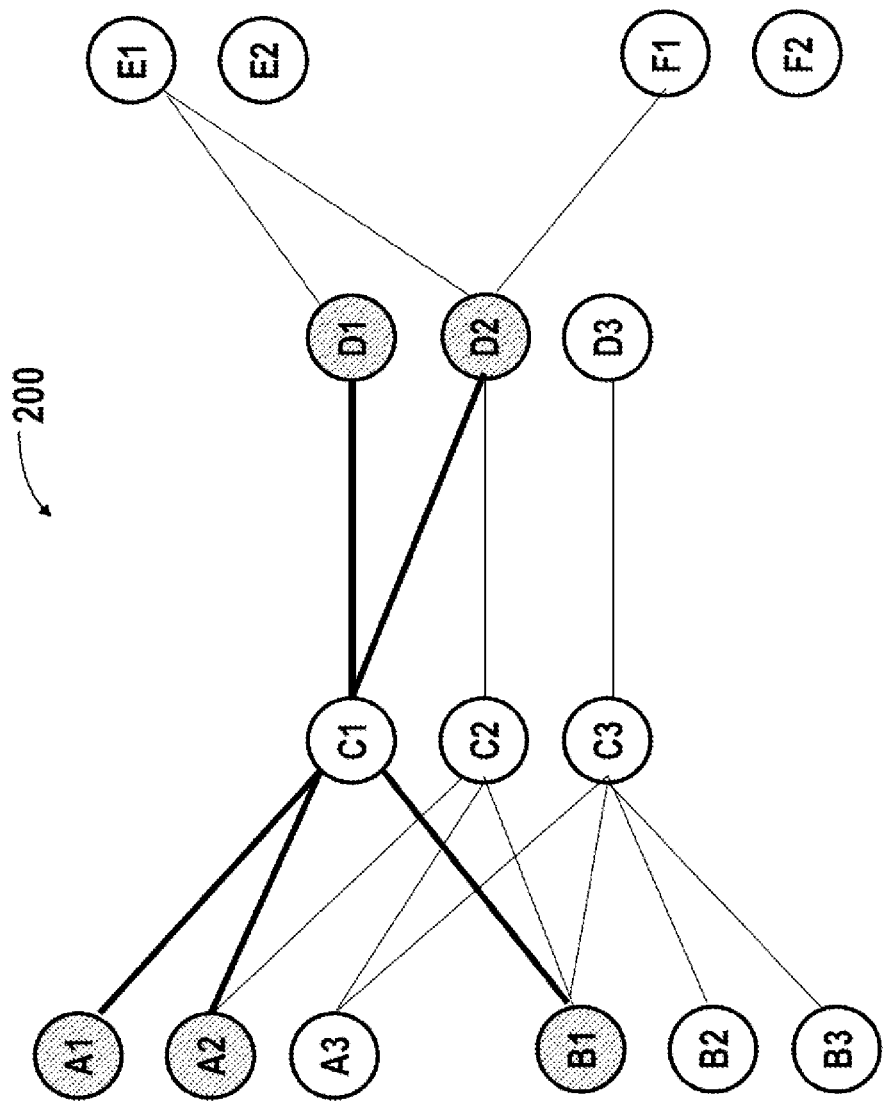
FIG. 2 and FIG. 3 illustrate a conventional find path algorithm applied to a graph.
Figure 3:
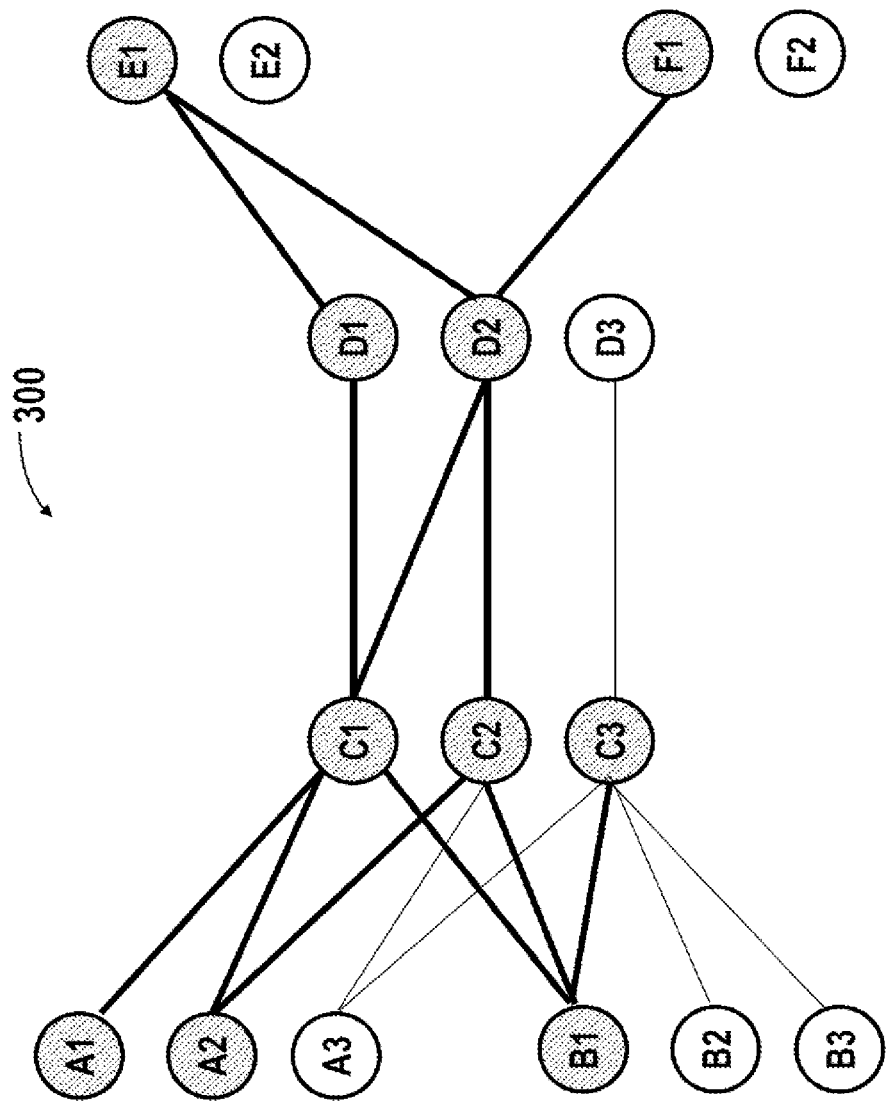

FIG. 2 and FIG. 3 show an example of applying the conventional find path algorithm, for example described above, to a graph. As shown in FIG. 2, assuming the problem is to find all paths between C1 (source) and E1 (destination or target) with maximum path length of 2. As shown in the example of graph G 200, the process may include, where Source is C1, Target is E1, and MAX is 2:

1. Start with Source, C1
2. Traverse from Source to all neighbor(s) of the Source: A1, A2, B1, D1, D2
3. Intersect neighbors and Target E1—no paths found at this step
4. Set MAX=2−1=1

The edges that have been traversed are highlighted in FIG. 2 (heavy lines).

5. As MAX is not 0, set each of neighbors as Source: A1, A2, B1, D1, D2 and repeat steps 2-5. Below are the examples of results for the repeated steps which is shown in FIG. 3 300:
2 (repeated). Traverse from Source to all neighbors: C1, C2, C3, E1, F1
3 (repeated). Intersect neighbors and Target E1. At this step, E1 is found in neighbors. Save paths to reach E1: (1) C1-D1-E1, (2) C1-D2-E1
4 (repeated). Set MAX=1−1=0
5. MAX=0, loop stops
6. Return saved paths (subgraph): (1) C1-D1-E1, (2) C1-D2-E1

Optimized Find Path Algorithm

The present disclosure provides a method of optimizing the find path algorithm using metadata. In particular, metadata may be used to perform graph reduction at one or more steps of the algorithm. The optimized graph or reduced graph may be a metadata graph.

As described elsewhere herein, metadata may comprise information about the vertices and the edges. For example, metadata may include entity class/set, edge type, and the like. Edge type may include a definition of an edge having a characteristic(s). A plurality of edges of the same edge type may share the same characteristic(s). In some cases, a single edge type may only connect one to two sets. For example, an edge type of 'Ownership,' connecting the set Persons and the set Cars, may define the edges representing an ownership relation between a person and a car. In such cases, the set Persons may include all the elements sharing the same characteristics (e.g., entity class as Person), which may be presented as vertices in the original graph where each vertex represents a person. Similarly, the set Cars may include all the element sharing the same characteristics as "Car," which may be represented as vertices in the original graph where each vertex represents a car.

The reduced graph may be a metadata graph. The reduced graph may comprise one or more reduced vertices and one or more edge types. A reduced vertex in a metadata graph may represent a set of elements (e.g., represented as individual vertices in the original graph), and an edge in a metadata graph may represent a relation between two sets (e.g., edge type). A reduced graph in a second degree may comprise a filtered data graph in which vertices belonging to excluded sets are not included.

Figure 4:
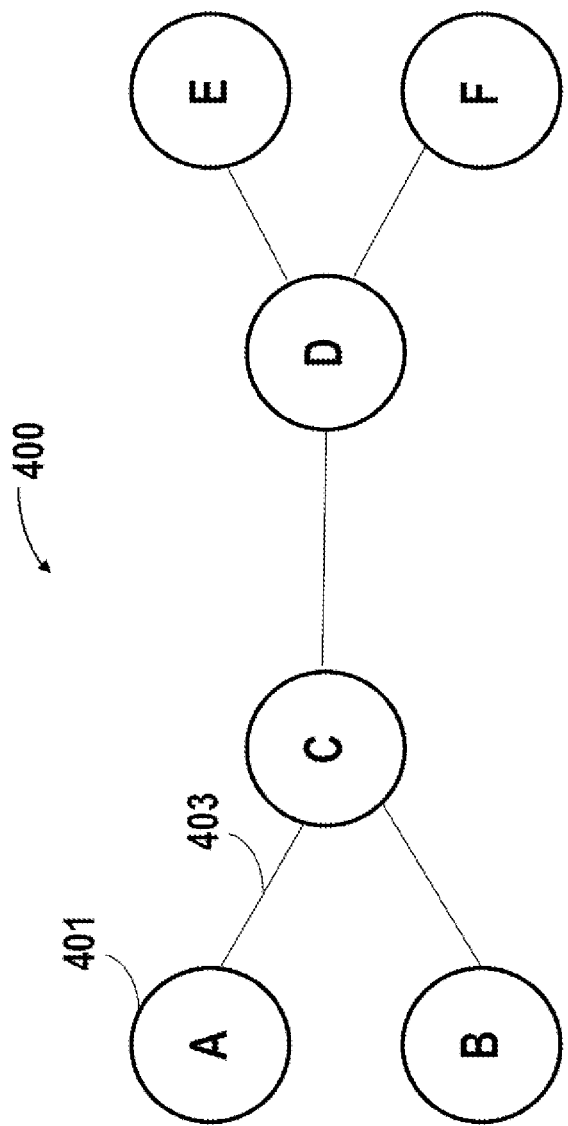
FIG. 4 shows an example of a metadata graph.

FIG. 4 shows an example of a metadata graph. The metadata graph may be generated based on the metadata describing the vertices and edges in the original graph. The metadata describing the elements and edges may be retrieved from a database model as described later herein. Upon receiving the metadata, vertices (A1, A2, A3) belonging to the same set or class may be represented by a corresponding reduced vertex (e.g., A 401) and respective edges of the respective vertices belonging to the same edge type may be represented by a single edge (e.g., edge 403) in the reduced graph, i.e., the metadata graph. For example, in a metadata graph, a source vertex may represent the source set (e.g., C) that the source element (e.g., C1) belongs to and a target vertex may represent the target set (e.g., E) that the target element (e.g., E1) belongs to. The source vertex, and target vertex in the metadata graph or the reduced graph may also be referred to as reduced source vertex, and reduced target vertex, respectively.

The provided methods may further comprise applying an optimization algorithm to the metadata graph. The optimization algorithm may include, on the metadata graph, excluding neighbors that are beyond the maximum path length. This optimization algorithm may exclude neighbors or vertices that are too far from the target's set or target vertex which may not worth further calculation thereby reducing the amount of calculation. By employing the metadata graph and the optimization algorithm, an exemplary optimized find path algorithm may include the following operations:

1. Set the predetermined maximum path length (MAX)
2. Start with a Source vertex, and identify a Source reduced vertex containing the Source vertex
3a. On the metadata graph, filter edge type(s) connecting the Source reduced vertex to neighbor reduced vertices, where the neighbor reduced vertices of the filtered edge type(s) lead to the Target reduced vertex (containing the Target vertex) with path length no greater than MAX−1. In some cases, filtering edge type(s) may generally refer to parsing the edge type(s) between the source reduced vertex and one or more neighbor reduced vertices that meet a requirement, i.e., a path length between the neighbor reduced vertices to the target reduced vertex is no greater than Max−1. For example, the operation 3a may be performed by identifying the edge types(s) connecting the source reduced vertex to all the neighbor reduced vertices, determining a path length between the identified neighbor reduced vertices to the target reduced vertex, retaining the edge type(s) connected to the neighbor reduced vertices as filtered edge type(s) when the respective path length is no greater than Max−1 and disregarding the edge type(s) when the respective path length is greater than Max−1.
3b. At the data level (i.e., original graph G), traverse from Source vertex to neighbor vertices using edges of only the filtered edge type(s) identified in 3a
4. Intersect the neighbor vertices (from 3b) and Target vertex and save paths as the intersection result
5. Set MAX=MAX−1
6. Until MAX=0, update the Source vertex by setting each neighbor vertex (e.g., un-intersected neighbor vertex) as Source vertex and refresh Source Set(s), and repeat steps 1-5. In some cases, refreshing the source set comprises setting a reduced vertex contains one or more of the new source vertices to the source reduced vertex. The one or more of the new source vertices may belong to a data set represented by the source reduced vertex.

7. Return saved paths (subgraph)

FIG. 5 shows an example of the lengths of all the paths in the metadata graph (e.g., 400). A, B, C, D, E, F represent reduced vertices (Sets of vertices where each reduced vertex represents a set of original data elements). An edge type A-C may indicate that there can be a relation between a vertex from Set A (reduced vertex A) and a vertex from Set C. For example, if Set C includes Individuals and Set A includes Cars, an edge A-C may define relation type of Ownership.

Figure 6:
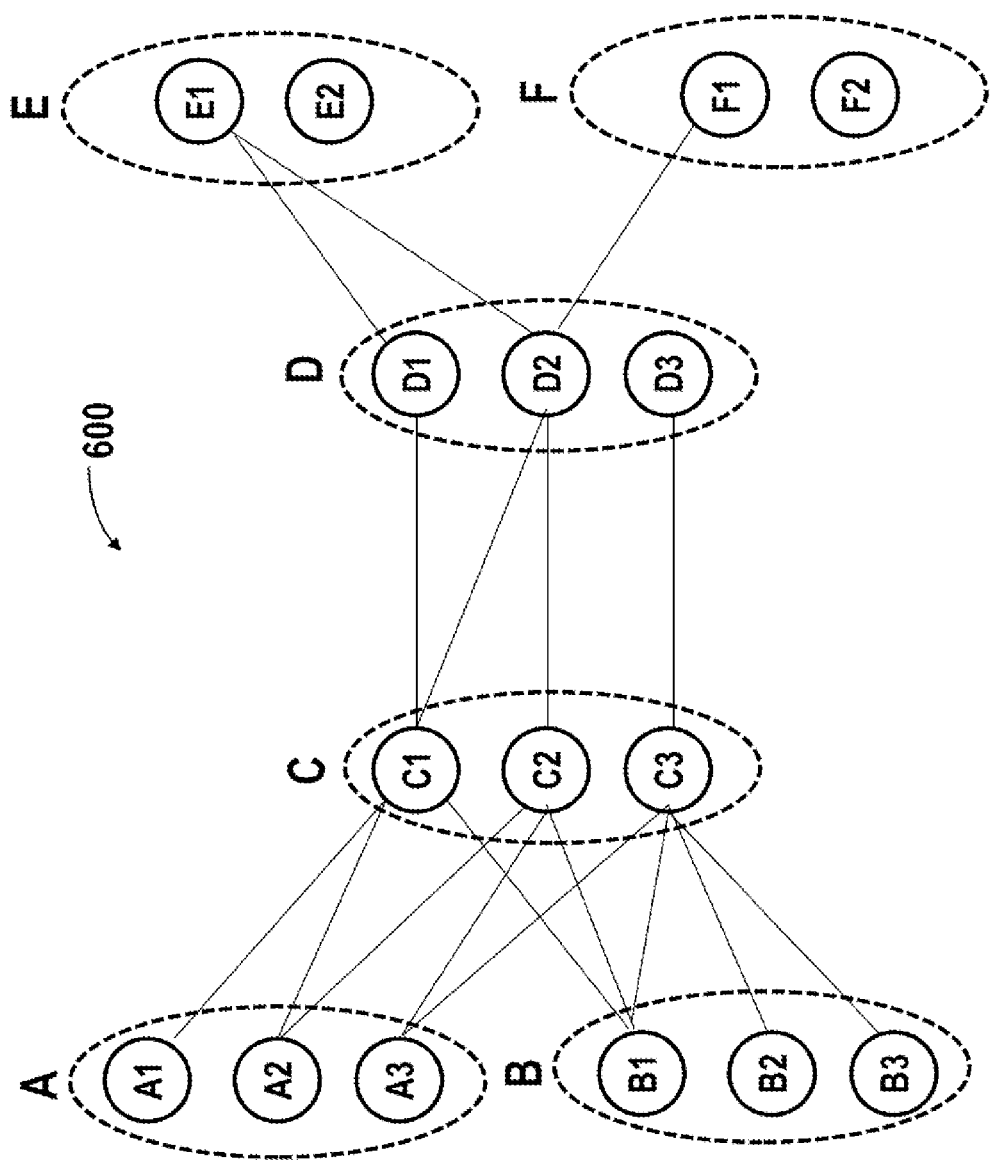
FIG. 6 shows an example of reducing an original data graph G to a metadata graph.

FIG. 6 shows an example of reducing an original data graph G to a metadata graph 600. As described above, the metadata graph may be generated based on the metadata for each vertex and edge in the original graph. For example, vertices A1, A2, and A3 in the original graph may be reduced to or represented by a single reduced vertex A in the metadata graph; vertices B1, B2, and B3 in the original graph may be reduced to or presented by a single reduced vertex B in the metadata graph; C1, C2, and C3 in the original graph may be reduced to or represented by a single reduced vertex C in the metadata graph; D1, D2, and D3 in the original graph may be reduced to or represented by a single reduced vertex D in the metadata graph; etc. An edge in the metadata graph (e.g., edge 403) may correspond to an edge type connecting two sets (of original data elements). For example, edges A1-C1, A2-C1, A2-C2, A3-C2, and A3-C3 in the original graph may be reduced to Edge Type A-C in the metadata graph; edges B1-C1, B1-C2, B1-C3, B2-C3, and B3-C3 in the original graph may be reduced to Edge Type B-C in the metadata graph; etc.

Figure 7:
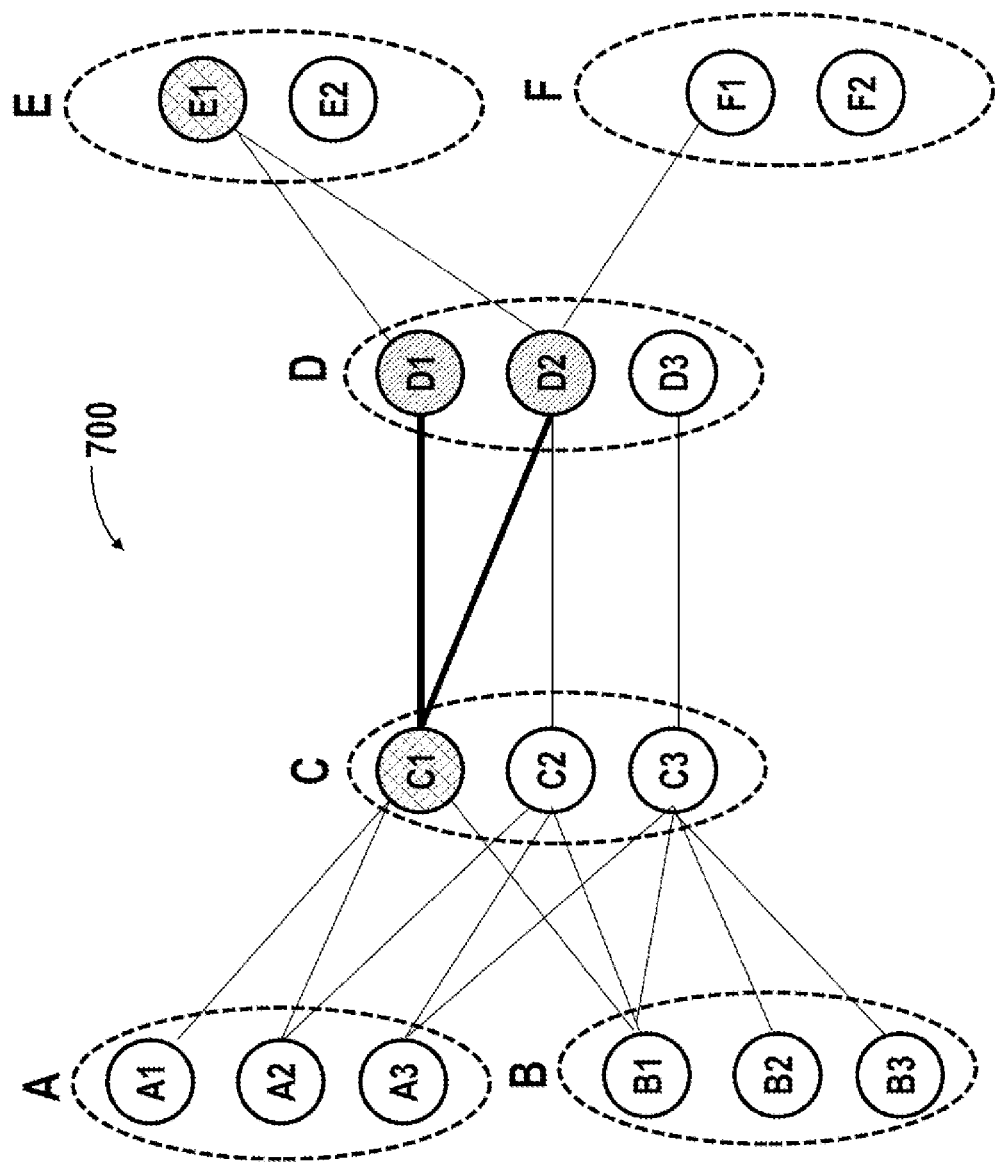
FIG. 7 and FIG. 8 illustrate an example of performing an optimized find path algorithm.
Figure 8:
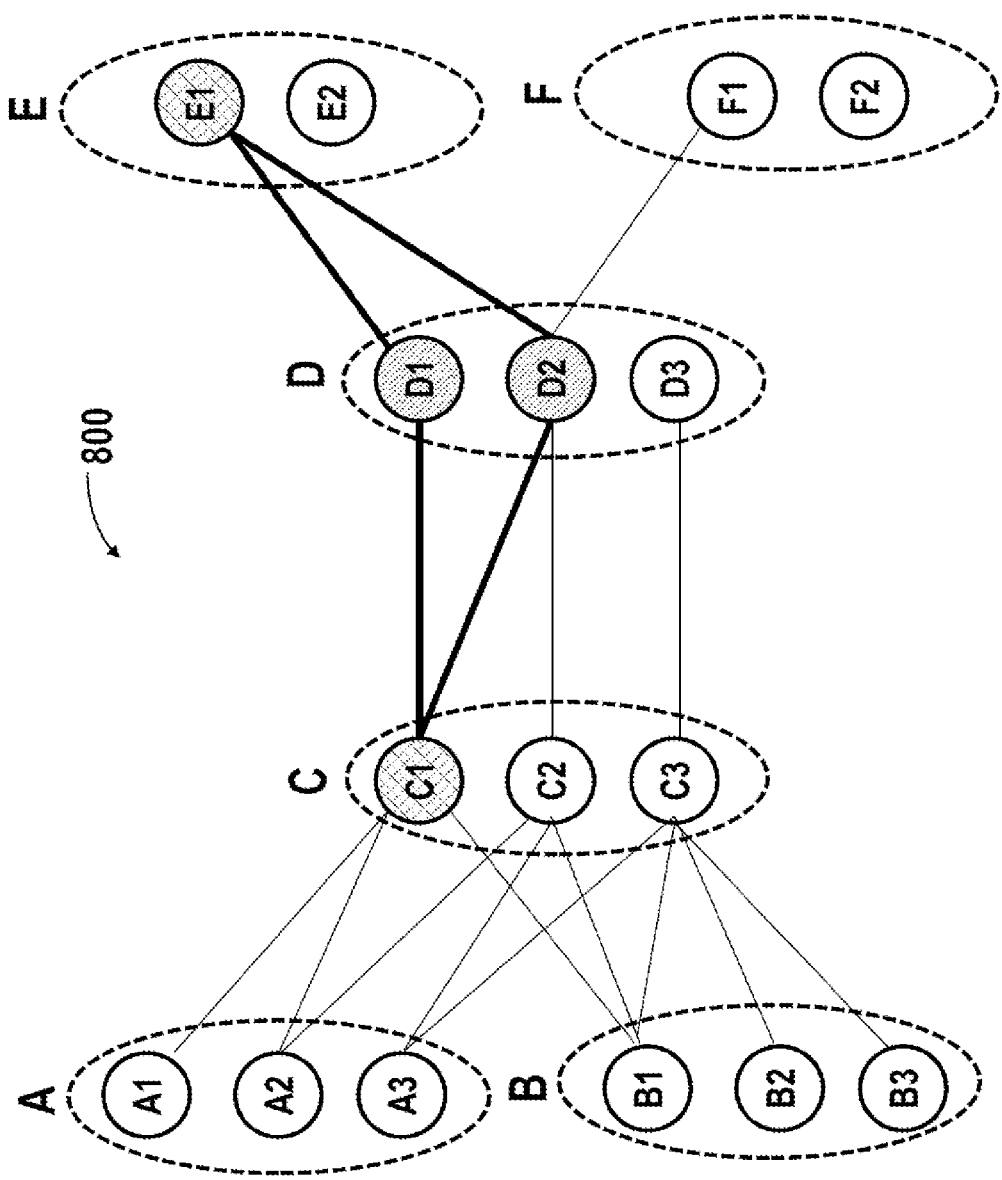

FIG. 7 and FIG. 8 illustrate an example of performing an optimized find path algorithm. Assuming the problem is the same as described in FIG. 2 and FIG. 3, the algorithm for finding all the paths from source C1 to target E1, with a predetermined maximum path length (MAX)=2, include:

1. Start with Source vertex C1. At the metadata level, Set C is identified as the Source reduced vertex (Source Set) which includes the source vertex C1.

2a. At the metadata level, filter edge type(s) connecting Source Set C to neighbor reduced vertices, where the neighbor reduced vertices of the filtered edge type(s) lead to Target Set E (the Target reduced vertex containing the target vertex E1) with path length no greater than MAX−1 (e.g., MAX=2). In the example, edge type C-D is retained as filtered edge type (because the length/distance from the neighbor reduced vertex D to target reduced vertex E is 1 which is no greater than Max−1=1), and edge types C-A and C-B are excluded. Sets A and B are excluded because the distance from set A and set B to Set E, respectively, has a length (e.g., length=3) that is greater than MAX−1 (e.g., MAX=2).

2b. At the data level, traverse from Source vertex C1 to neighbor vertices using edges of only the filtered edge type(s) identified in 2a (i.e., edge type C-D). At this step, neighbor vertices D1, D2 are found.

3. Intersect neighbor vertices (D1, D2 from 2b) and Target vertex (E1). At this step, no paths are found.

4. Set MAX=2−1=1

5. Since MAX is not 0, update the Source vertex by setting the neighbors identified in 2b (D1, D2) as the Source vertex (D1, D2) and refresh Source Set(s) (set D), then repeat steps 2-4. Below are examples of the repeated steps:

Repeated step 2a. At the metadata level, filter edge type(s) connecting Source Set D to neighbor reduced vertices, where the neighbor reduced vertices of the filtered edge type(s) lead to Target Set E with path length no greater than MAX−1 (e.g., MAX=1). In the example, edge type D-E is retained, and edge types D-C and D-F are excluded. Sets C and F are excluded because the distance from sets C and F, respectively, to E equals 2 which is greater than current MAX−1=0.

Repeated step 2b. At the data level, traverse from Source vertex (D1, D2) to neighbors using edges of only the filtered edge type(s) (i.e., D-E) identified in 2a. At this step, neighbor vertex E1 is found.

Repeated step 3. Intersect neighbor vertices from 2b and Target E1. E1 is found in neighbors. Save paths to reach E1: (1) C1-D1-E1, (2) C1-D2-E1.

Repeated step 4. Set MAX=1−1=0

5. MAX=0, loop stops.

6. Return saved paths (subgraph): (1) C1-D1-E1, (2) C1-D2-E1.

Using the improved algorithm, fewer edges are traversed (as shown in FIG. 8, 800) compared to the edges traversed using the conventional algorithm (as shown in FIG. 3, 300).

Figure 9:
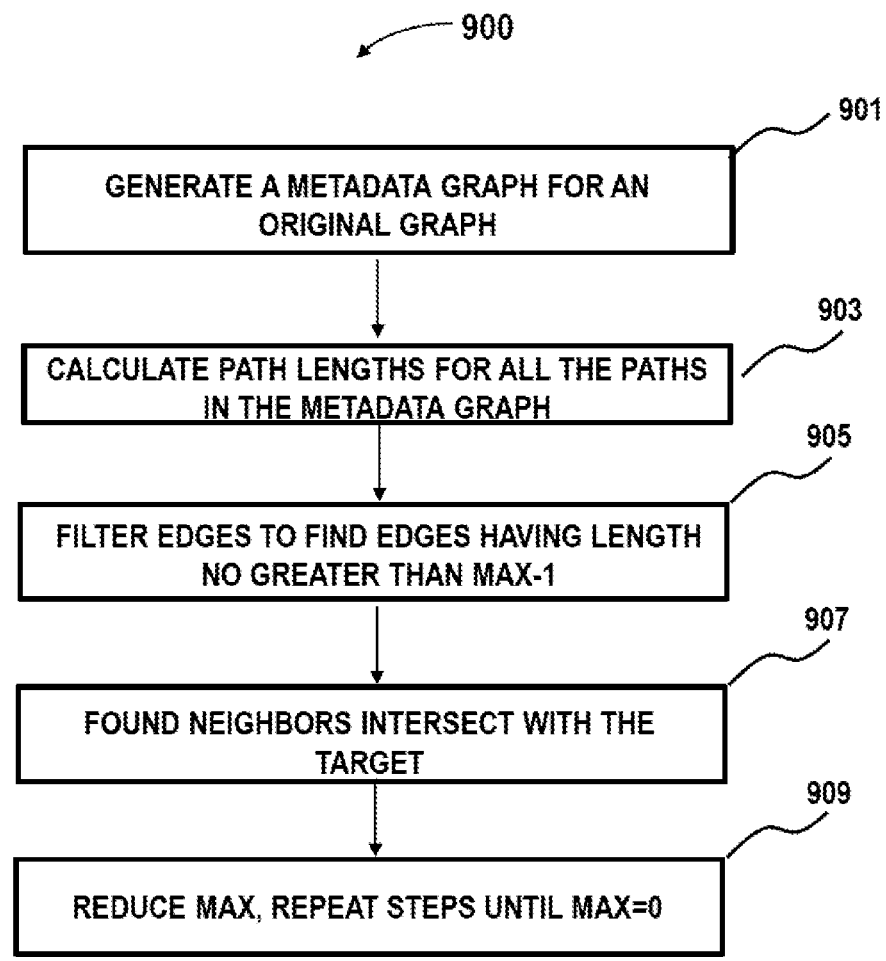
FIG. 9 illustrates an example method for improving a find path algorithm, in accordance with some embodiments of the present disclosure.

FIG. 9 illustrates an example of a method 900 for improving a find path algorithm, in accordance with some embodiments of the present disclosure. The method may include, for example, generating a reduced graph 901. The reduced graph may be generated using metadata retrieved from a database. The reduced graph may be a metadata graph as described above. The method may comprise calculating the path lengths between the reduced vertices in the metadata graph 903 (e.g., such as shown with respect to FIG. 5). Due to the small size of the metadata graph, the calculation can be fast. Next, the method may proceed with excluding paths in the metadata graph that have a length greater than the maximum length, and identifying edges that lead to the target set with a distance no greater than the maximum length, thereby identifying neighbor(s) that are connected by the identified edges 905. The neighbors/vertices identified in 905 may be processed to identify neighbors/vertices intersecting the target 907. The steps 903 and 905 are repeated, refreshing the source to the neighbors found in 905, until the maximum number is reduced to zero 909.

The optimized find path algorithm of the present disclosure may be extended for 2-way implementation, by being able to start from both the Source set and the Target set. In a first direction, the algorithm may start from the Source and find a path towards the Target, by refreshing the 'Source' set with each iteration. In a second direction, the algorithm may start from the Target and find a path towards the Source, by refreshing the 'Target' set with each iteration. By going two ways, the processor can reduce the number of paths being searched, as the number of paths can grow exponentially with each step. The source reduced vertex and the target reduced vertex may be updated or refreshed substantially simultaneously or in an alternating fashion. For example, there are significantly fewer paths to process when performing 3 steps from both ways by using each of the Source set and the Target as the start set than performing 6 steps using a single set (i.e., either Source set or Target set) as the start set. The 2-way traversing can be implemented simultaneously or substantially simultaneously. The 2-way traversing can be implemented sequentially. For example, when implemented sequentially, the processor may alternate which set to refresh (e.g., Source->Target->Source->Target, etc.) or use various statistics to choose an optimal sequence of sets (e.g., Source->Source->Target->Source->Source, etc.).

In an illustrative example, a sequential approach is used. The algorithm for finding all the paths from source C1 to target E1, with a predetermined maximum path length (MAX)=2, include:

1.1 Choose side (Source or Target). For this example iteration, Source is chosen, to start with C1 as the Source.

1.2.a In the metadata level, Set C is identified as the Source reduced vertex (Source Set) for including C1. At the metadata level, filter edge type(s) connecting Source Set C to neighbor reduced vertices, where the neighbor reduced vertices of the filtered edge type(s) lead to Target Set E (the Target reduced vertex containing the target vertex E1) with path length no greater than MAX−1 (e.g., MAX=2). In the example, edge type C-D is retained, and edge types C-A and C-B are excluded. Sets A and B are excluded because the distance from set A and set B to Set E, respectively, has a length (e.g., length=3) that is greater than MAX−1 (e.g., MAX=2).

1.2.b. At the data level, traverse from Source vertex C1 to neighbor vertices using edges of only the filtered edge type(s) identified in 1.2.a (i.e., C-D). At this step, neighbor vertices D1, D2 are found.

1.3. Intersect neighbor vertices (D1, D2 from 1.2.b) and Target vertex (E1). At this step, no paths are found.

1.4. Set MAX=2−1=1

1.5. MAX is not 0, so set neighbors as Source vertex (D1, D2) and refresh Source Set(s) (set D), and repeat steps 1.1-1.5. The current state is illustrated in FIG. 7. Below are examples of the repeated steps:

Repeated step 1.1. Choose side (Source or Target). For this example iteration in this sequential approach, this time, the Target is chosen, to start with E1 as the Target.

Repeated step 1.2.a. In the metadata level, Set E is identified as the Target reduced vertex (Target Set) for including E1. At the metadata level, filter edge type(s) connecting Target Set E to neighbor reduced vertices, where the neighbor reduced vertices of the filtered edge type(s) lead to Source Set D with path length no greater than MAX−1 (e.g., MAX=1). In the example, edge type E-D is retained (this is also the only edge type form Set E) because the distance from set D equals 1, which is greater than current MAX−1=0.

Repeated step 1.2.b. At the data level, traverse from Target vertex (E1) to neighbors using edges of only the filtered edge type(s) (i.e., D-E) identified in 1.2.a. At this step, neighbor vertices D1 and D2 are found.

Repeated step 1.3. Intersect neighbor vertices from 1.2.b and Source D1 and D2. D1 and D2 are found in neighbors. Save paths to reach E1: (1) C1-D1-E1, (2) C1-D2-E1.

Repeated step 1.4. Set MAX=1−1=0

Repeated Step 1.5. MAX=0, loop stops.

1.6. Return saved paths (subgraph): (1) C1-D1-E1, (2) C1-D2-E1.

This algorithm traversed only the bolded edges and visited only the four shaded vertices, as seen in FIG. 8.

The metadata, elements, set and the like may be stored in database. In some cases, the metadata may be based on the characteristics/properties or definition of entity class that a data object belongs to. The entity class or properties may be stored in a data structure of the database. The database may be a relational database. It should be noted that the provided method can be applied to any data structures so long as the metadata of the vertices and edges is available. Below is an example of a database for storing graphs, data objects/elements and metadata.

Database Systems

A relational database may be summarized as follows: there are at least two sets of elements and at least one relation that define how elements from a first set are related to elements of a second set. The relation may be defined in a data structure that maps elements of the first set to elements of the second set. Such mapping may be brought about with the aid of unique identifiers (within each set) of the elements in each set. A relational database designer may find it challenging to describe real life events and entities on a very complex tables and relations diagram. Real life events, however, may be suitably defined and presented with the aid of electronic mind maps (also referred to as "mind maps" herein).

In some embodiments, an electronic mind map is a diagram which may be used to visually outline and present information. A mind map may be created around a single object but may additionally be created around multiple objects. Objects may have associated ideas, words and concepts. In some instances, the major categories radiate from each node, and lesser categories are sub-branches of larger branches. Categories can represent words, ideas, tasks, or other items related to a central key word or idea.

Figure 10:
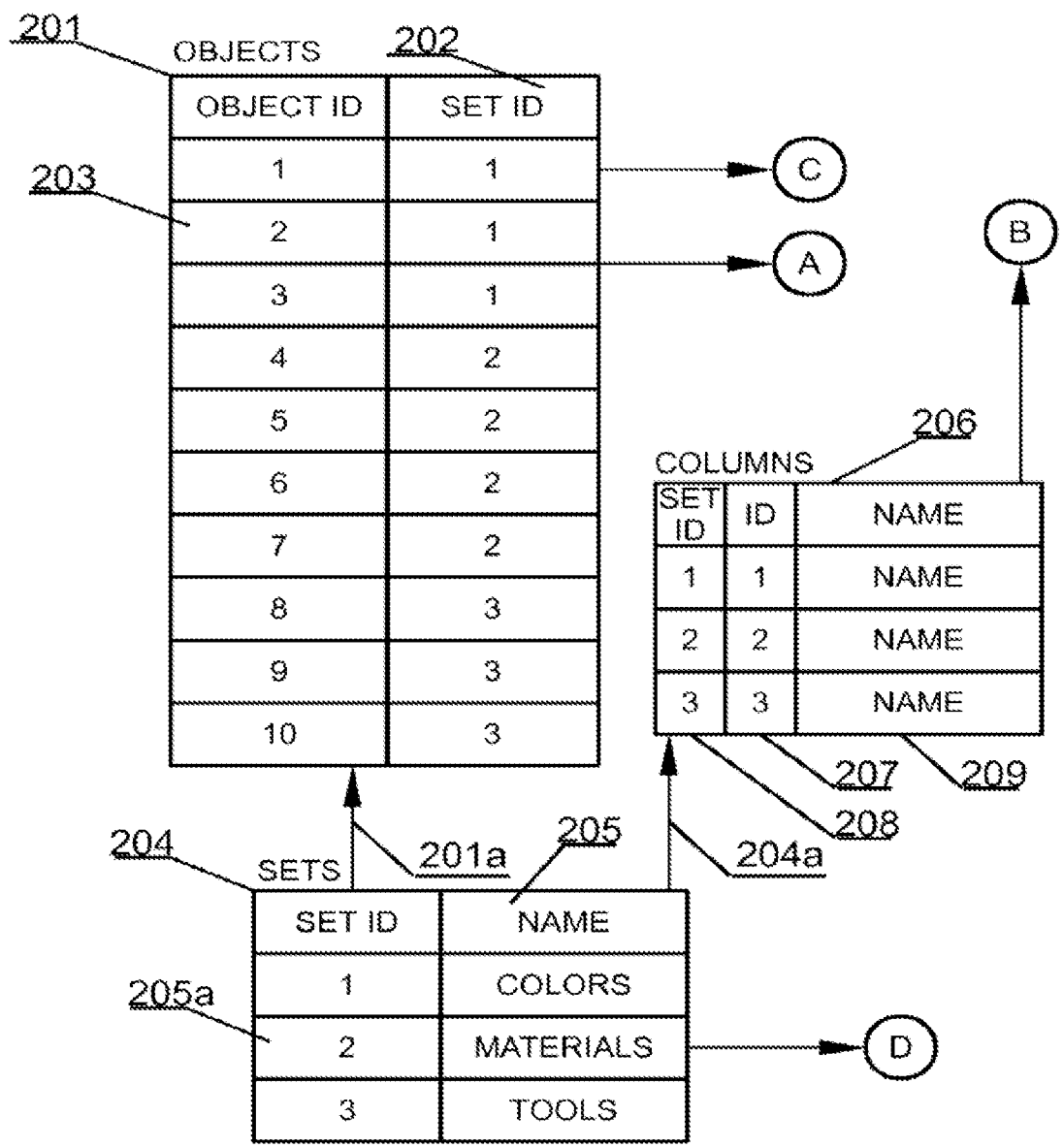
FIG. 10 and FIG. 11 show an example of a database system.
Figure 11:
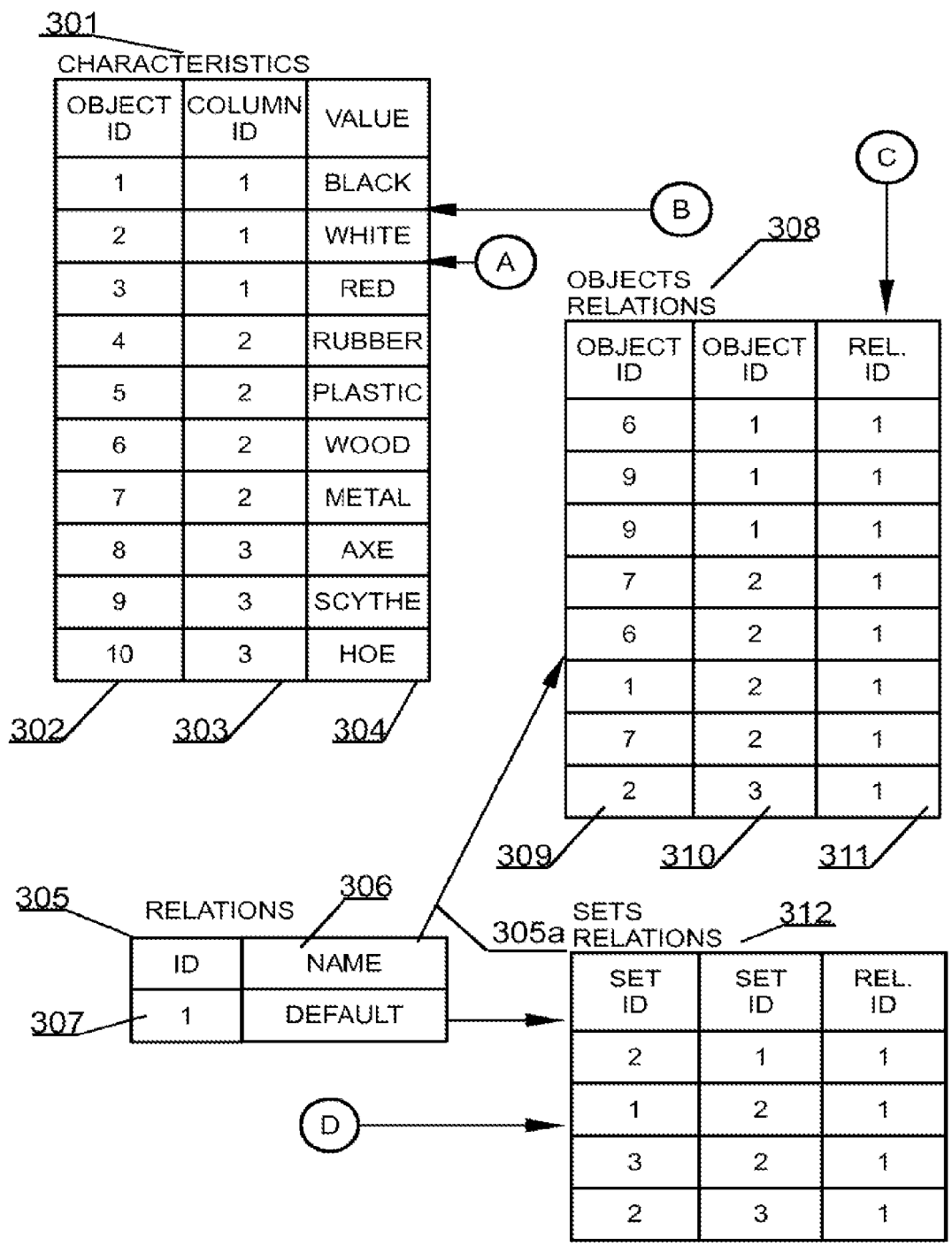

FIG. 10 and FIG. 11 show an example of a database system. In order to cooperate with mind maps, the database system has been designed differently than known database systems. The database system may comprise six data structures and optional data structures. The six data structures may comprise SETS 204, OBJECTS 201, COLUMNS 206, CHARACTERISTICS 301, RELATIONS 305 and OBJECTS RELATIONS 308. The names above are examples and the respective sets may be defined rather by their function within the system than their name.

The first data structure is called SETS 204 because it may be used to logically hold data related to sets of data. Sets of data may be represented on a mind map as nodes. Each entry in a SETS data structure 204 may comprise at least a unique identifier 205a of a data set and may also comprise a name 205 of the data set. The SETS data structure may be a top level structure and may not refer to other data structures, but other data structures may refer to the SETS data structure as identified by respective arrows between the data structures of FIG. 10.

Each set of data may be, as in the real world, characterized by one or more properties. The second data structure may be called COLUMNS 206. A property, typically referred to as a "column," may be uniquely identified with an identifier ID 207 and may be associated with a data set, defined in the SETS data structure 204, with the aid of an identifier herein called SET ID 208. A column may also be associated with a name 209. As indicated by an arrow 204a, the COLUMNS data structure may logically, directly reference the SETS data structure 204, because the COLUMNS data structure may utilize the identifiers of data sets. If, for example, each color of the data set called COLORS comprises another property, such as RGB value, in an example, an entry in the COLUMNS data structure may comprise the following values: '1, 4, RGB'. Referring back to an example from FIG. 10, there may be three columns wherein each column is associated with a textual identifier "NAME" 209.

Objects may form elements of respective data sets in the SETS 204 data structure and may have properties defined by the COLUMNS 206 data structure. Objects may be held in the OBJECTS 201 data structure. The OBJECTS 201 data structure may hold entries uniquely identified with an identifier ID 203 and associated with a set, defined in the SETS data structure 204, with the aid of an identifier herein called SET ID 202. As indicated by an arrow 201a, the OBJECTS data structure may logically, directly reference the SETS data structure, as, for example, the SETS data structure utilizes identifiers of sets. Referring back to an example from FIG. 10, there are ten objects in the database, namely three colors, four materials, and three tools. Hence, the OBJECTS data structure 201 may comprise ten objects.

A fourth data structure, identified as CHARACTERISTICS 301 in FIG. 11, may hold data entries of each property of each object in FIG. 11. This data structure may be a fundamental difference from known databases in which there are rows of data that comprise entries for all columns of a data table. In the present disclosure, each property of an object is stored as a separate entry, which may greatly improve scalability of the system and allow, for example, the addition of object properties in real time. The metadata-based path finding methods described elsewhere herein may be executed without involving the fourth data structure.

The CHARACTERISTICS 301 data structure may hold entries uniquely identified using an identifier OBJECT ID 302 and may be associated with a property, defined in the COLUMNS data structure 206, with the aid of an identifier herein referred to as COLUMNID 303. Further, each entry in the CHARACTERISTICS data structure may comprise a value of a given property of the particular object. As indicated by respective arrows originating from sources A and B, the CHARACTERISTICS data structure 301 may logically, directly reference the COLUMNS data structure and the OBJECTS data structure, because CHARACTERISTICS data structure 301 uses the identifiers from the respective data structures. CHARACTERISTICS data structure 301 includes a VALUE property 304, such as: black, white, red, rubber, plastic, wood, metal, axe, scythe, and hoc.

Referring to an example from FIG. 11, there are ten characteristics that may result from the premise that there are three colors, four materials and three tools. By way of a non-limiting example, one can easily recognize that the BLACK color refers to an object having ID of 1 and a property having ID of 1. By using these identifiers, for example, one may determine that the property description is "NAME" and that the object belongs to the set whose description is "COLORS".

A fifth data structure, RELATIONS 305, may function as an operator to hold data regarding relations present in the database. This may be a simple structure and, in principle, may hold an identifier of a relation ID 307 and additionally hold a textual description of the relation i.e., a NAME 306. As indicated by an arrow 305a, the RELATIONS data structure may logically, directly reference (e.g., downwards direction) an OBJECTS RELATIONS data structure 308, because the OBJECTS RELATIONS may use the identifiers of the relations. While only one entry is illustrated in the RELATIONS data structure, there may be a plurality of types of relations. For example, a type of relation may be indicative of a direction (e.g., unidirectional, bidirectional, etc.) of a relation.

Referring back to mind maps, for example, a relation present in the RELATIONS 305 data structure, may directly map to a branch between two nodes of a mind map. In some embodiments, as in typical mind maps, a relation may be provided with a textual description.

A sixth data structure may be the OBJECTS RELATIONS data structure 308. This data structure may be designed to provide mapping between a relation from the RELATIONS data structure 305 and two objects from the OBJECTS data structure 201. For example, a first entry in the OBJECTS RELATIONS data structure 308 defines that a relation having identifier of 1 exists between object having an identifier of 1 and an object having an identifier of 6. This may be an exact definition that a material of wood has a color of black, which is defined across the present relational database system. OBJECT RELATIONS data structure 308 includes Object ID columns 309, Object ID column 310, and Relation ID column 311.

In some embodiments, a seventh data structure may exist in a database system. This data structure may hold data regarding relations between respective data sets and in FIG. 11 may be referred to as SETS RELATIONS 312. This data structure may function or operate to provide mapping between a relation from the RELATIONS data structure 305 and two sets from the SETS data structure 204. For example, a first entry in the SETS RELATIONS data structure 312 may define that the relation having identifier of 1 may exist between a set having an identifier of 1 and a set having an identifier of 2. Providing an entry in the SETS RELATION data structure 312 between a set having an identifier of 1 and a set having an identifier of 2 as well as between a set having an identifier of 2 and a set having an identifier of 1, may allow for creating a bidirectional relation.

There is also a possibility of self-referencing from a given set. For example, such case may be present when there is a set of persons and there exists a student—teacher relation between persons assigned to a particular set. Self-referencing links can be also unidirectional which means that the Entities are bound only in one direction. One can fetch information about linked Entities but cannot refer back to source from the results.

As described, a relational database system of tables may, in one possible example implementation, be stored in the above-described six data structures. In some instances, most of the data may be kept in the OBJECTS and CHARACTERISTICS data structures.

The data structures that are illustrated and described in FIG. 10 and FIG. 11 may also be altered in various ways. For example, in FIG. 10, the OBJECTS data structure can be partitioned or sharded according to SET ID 202. Sharding, as used herein, may generally refer to horizontal partitioning, whereby rows of database tables may be held separately rather than splitting by columns. Each partition may form part of a "shard," wherein each "shard" may be located on a separate database server or physical location. Similarly, in FIG. 11, for example, the CHARACTERISTICS data structure can be partitioned or sharded according to COLUMN ID 303. When sharding is used, for every column in a set, the system may create key value tables that can comprise of the values from the chosen column. The OBJECT RELATIONS table can also be partitioned or sharded according to the REL ID 311 or sharded according to an algorithm that can maintain persistence. FIGS. 10 and 11 are for illustration purposes only and may comprise of more columns than is illustrated in those figures.

Figure 12:
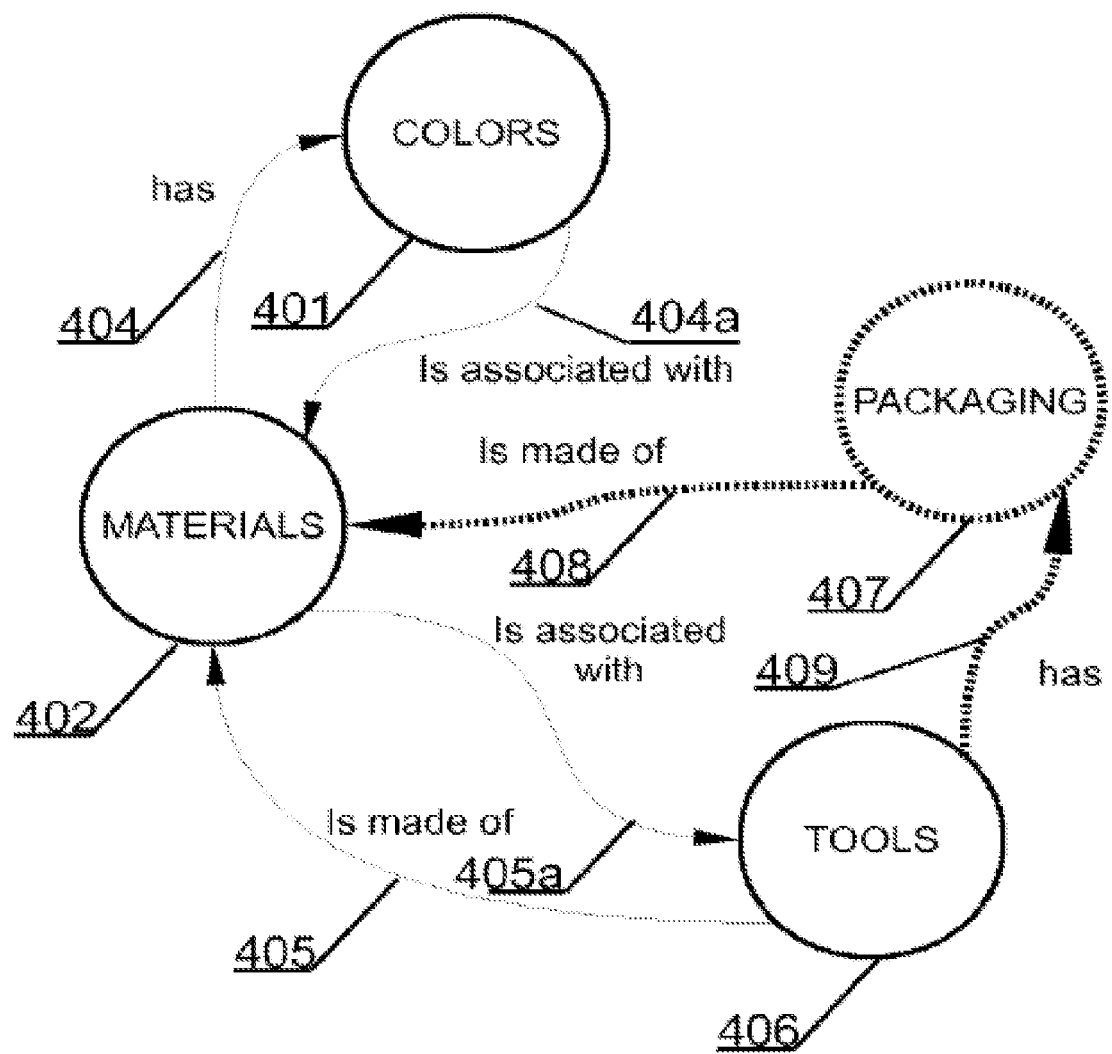
FIG. 12 depicts a mind map that may represent relationships in the database of FIG. 11.

FIG. 12 depicts a mind map that may represent relationships in the database of FIG. 11. There are three nodes that may represent sets of data, namely COLORS 401, MATERIALS 402 and TOOLS 406. A mind map may additionally define branches between respective nodes. Taking into account the relational database which may be defined according to the new database system in FIGS. 10 and 11, there are four branches. A first branch 404 of the mind map is defined between COLORS 401 and MATERIALS 402 and may imply that a MATERIAL may have a COLOR. A second branch 404a of the mind map may be defined between COLORS 401 and MATERIALS 402 and may imply that a COLOR may be associated with a MATERIAL.

Similar to the first two branches, a third branch 405 of the mind map is defined between MATERIALS 402 and TOOLS 406 and may imply that that a TOOL may be made of a MATERIAL. A fourth branch 405*a* of the mind map may be defined between MATERIALS 402 and TOOLS 406 and may imply that a MATERIAL may be associated with a TOOL.

The relational database may be further expanded to also encompass a possibility that a TOOL may have 409 a PACKAGING 407 and the PACKAGING is made of a MATERIAL from MATERIALS 408.

In some embodiments, because all identifiers may be generated automatically, during creation of the database system of FIGS. 10-11, one may start from the mind map presented in FIG. 12. For each node, a designer may create a name of a set and properties of the objects that may be kept in the set. Similarly, the designer may create branches as relations between respective nodes, such as data sets. Based on such mind map definitions, the system of FIGS. 10-11 may be automatically generated from the mind map of FIG. 12. In particular embodiments, there may additionally be a process of assigning properties to each node of the mind map, wherein each property is an entry in the second data structure, such as the COLUMNS 206 data structure.

A database structure disclosed herein can be created by a method described as follows. A computer implemented method may store data in a memory and comprise the following blocks, operations, or actions. A first data structure may be created and stored in a memory, wherein the first data structure may comprise a definition of at least one data set, wherein each data set comprises a data set identifier and logically may hold data objects of the same type. Next, a second data structure may be created and stored in the memory, wherein the second data structure may comprise definitions of properties of objects, wherein each property may comprise an identifier of the property and an identifier of a set to which the property is assigned.

Further, a third data structure may be created and stored in the memory, wherein the third data structure may comprise definitions of objects, and wherein each object comprises an identifier and an identifier of a set the object is assigned to. A fourth data structure may be created and stored in the memory, wherein the fourth data structure may comprise definitions of properties of each object, and wherein each property of an object associates a value with an object and a property of the set to which the object is assigned. A fifth data structure may be created and stored in the memory, wherein the fifth data structure may comprise definitions of relations, and wherein each relation comprises an identifier of the relation. Finally, a sixth data structure may be created and stored in the memory, wherein the sixth data structure may comprise definitions of relations between objects wherein each objects relation associates a relation from the fifth data structure to two objects from the third data structure.

In accordance with the database system of the present disclosure, a process of adding an object (a record) to the database may be outlined as follows. First a new entry may be created in the OBJECTS data structure 201. The object may be assigned to a given data set defined by the SETS data structure 204. For each object property of the given set defined in the COLUMNS data structure 206, there may be created an entry in the CHARACTERISTICS data structure 301. Subsequently there may be created relations of the new object with existing objects with the aid of the OBJECTS RELATIONS data structure 308.

A method of removing objects from the database system is described below. First, an object to be removed may be identified and its corresponding unique identifier may be fetched. Next, any existing relations of the object to be removed with other existing objects may be removed by deleting entries in the OBJECTS RELATIONS data structure 308 that are related to the object being removed. Subsequently, the object entry may be removed from the OBJECTS data structure 201. The object may be removed from a given data set defined by the SETS data structure 204. Because the properties of each object are stored separately, for each object property of the given set defined in the COLUMNS data structure 206, there is removed an entry in the CHARACTERISTICS data structure 301 related to the object identifier being removed from the database.

A method for creating the database system using a mind map is provided. The first step may be to create a mind map structure. Defining a database system using a mind map may be beneficial and allow a designer to more easily see the big picture in very complex database arrangements. A designer may further be able to visualize the organization of data sets and relations that may exist between the respective data sets. Next, a new node may be added to the mind map structure. This may typically be executed via a graphical user interface provided to a database designer. A node of a mind map may represent a set as defined with reference to FIG. 10. Therefore, it may be advantageous at this point to define, preferably using the graphical user interface, properties associated with the data set associated with this particular node of the mind map. Then, a record or entry may be stored in the first and second data structures, which are the SETS data structure 204 and COLUMNS data structure 206 of FIG. 10, respectively.

The next step may be to create a branch within the mind map. A branch may start at a node of the mind map and end at the same node of the mind map to define a self-relation. For example, there may be a set of users for which there exists a hierarchy among users. Alternatively or in addition to, a branch may start at a node of the mind map and end at a different node, for example, of the mind map to define a relation between different nodes, i.e., different sets of objects of the same kind.

The following operations may be executed to store a record in the fifth data structure, which is the RELATIONS data structure 305 of FIG. 11. At least one object can be added to existing data sets, i.e., nodes of the mind map. In some embodiments, a way of adding objects to mind map nodes may be by way of a graphical user interface with one or more graphical elements representing nodes and connections among the nodes. For example, by choosing an option to add an object, a user may be presented with a set of properties that may be set for the new object. The properties may be defined in the COLUMNS data structure 206 of FIG. 10. After the user provides an input, an object may be added to the selected node of the mind map by storing one or more records in the third, fourth, and sixth data structures that are the OBJECTS data structure 201, the CHARACTERISTICS data structure 301 and OBJECTS RELATIONS data structure 308 of FIGS. 10 and 11, respectively.

Databases of the present disclosure may store data objects in a non-hierarchical manner. In some cases, such databases may enable database queries to be performed without the need of joins, such as inner or outer joins, which may be resource intensive. This may advantageously improve database queries.

Figure 13:
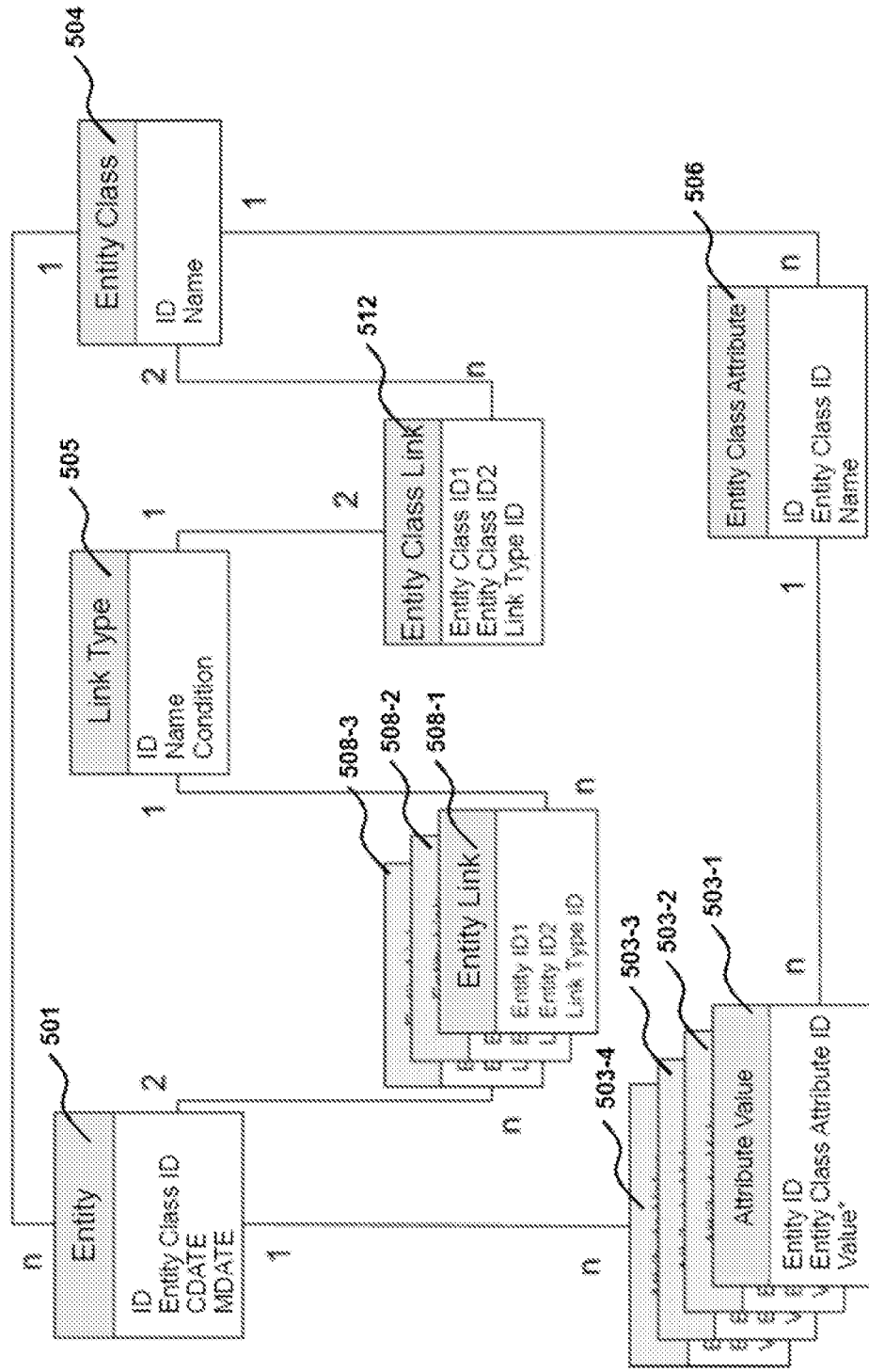
FIG. 13 shows a model of a database system.

In an example, FIG. 13 shows a model of a database system of the present disclosure. The model may be similar to, or correspond to, the examples of the database systems described in FIG. 10 and FIG. 11. The model may comprise a set of predefined data structures. In the illustrated model, the Entity data structure 501 may correspond to the OBJECTS data structure 201 as described in FIG. 2. Similarly, the Entity data structure may hold entries uniquely identified with an identifier ID (e.g., ID) and associated with an entity class, defined in the Entity Class data structure 504, with the aid of an identifier herein called Entity Class ID. The Entity data structure 501, in some embodiments, may further comprise a timestamp corresponding to the date and time an object is created (e.g., CDATE) and/or date and time an object is last modified (e.g., MDATE).

The Entity Class data structure can correspond to the SETS data structure 204 as described in FIG. 10. Similarly, the Entity Class data structure may hold data related to Entity Class data. Classes of data may be represented on a mind map as nodes. Each entry in an Entity Class data structure 504 may comprise at least a unique identifier (e.g., ID) and may also comprise its name (e.g., Name). For each entity property of the given entity class defined in the Entity Class Attribute data structure 506, there may be created an entry in the Attribute Value data structure 503-1, 503-2, 503-3, 503-4. Subsequently there may be created relations of the new object with existing objects with the aid of the Entity Link data structure 508-1, 508-2, 508-3.

The Entity Class Attribute data structure 506 can correspond to the COLUMNS data structure 206 as described in FIG. 10. Similarly, the Entity class Attribute data structure 506 may hold entries uniquely identified with an identifier ID (e.g., ID) that is associated with an entity class, defined in the Entity Class data structure 504, with the aid of the Entity Class ID, and the name of the attribute (e.g., Name). The Attribute Value data structure 503-1, 503-2, 503-3, 503-4 may correspond to the CHARATERISTICS data structure 301 as described in FIG. 11, except that the Attribute Value data structure may use multiple tables 503-1, 503-2, 503-3, 503-4 to hold entries uniquely identified using an identifier (e.g., Entity ID), a property defined in the Entity class Attribute data structure 506, with the aid of an identifier (Entity Class Attribute ID) and a value of a given property of the particular entity (e.g., Value). In some cases, the multiple tables may collectively hold the attribute values with each table storing a portion of the data.

The Entity Link data structure 508-1, 508-2, 508-3 can correspond to the OBJECTS RELATIONS data structure 308 as described in FIG. 11 with the exception that multiple tables 508-1, 508-2, 508-3 may be used to collectively hold data related to relations or connections between two entities. Similarly, an entry of the Entity Link data structure may comprise two entity IDs (e.g., Entity ID1, Entity ID2) and the identifier of the Link Type (e.g., Link Type ID) between the two entities. The Link Type identifier may reference from the Link Type data structure 505.

The Link Type data structure 505 can correspond to the RELATIONS data structure 305 as described in FIG. 11. Similarly, the Link Type data structure 505 may hold an identifier of a link type ID (e.g., ID) and additionally hold a textual description of the link (e.g., NAME). In some cases, the link type can define a permission level of accessing the connection between entities or entity classes. For example, the link type may be a private type link that only the user who creates the link or the system administrator can view or modify, or a public type link that can be viewed or defined by any user. For instance, an administrator or certain users with privileges may configure a link to be visible to other users. In this case, the administrator may decide to "publish" the link, which may enable the link to be available to the public, thereby converting the link type from private to public. Alternatively or in addition to, a link type may have various other permission levels or editable privileges that are provided by the system.

Computer Systems

Figure 14:
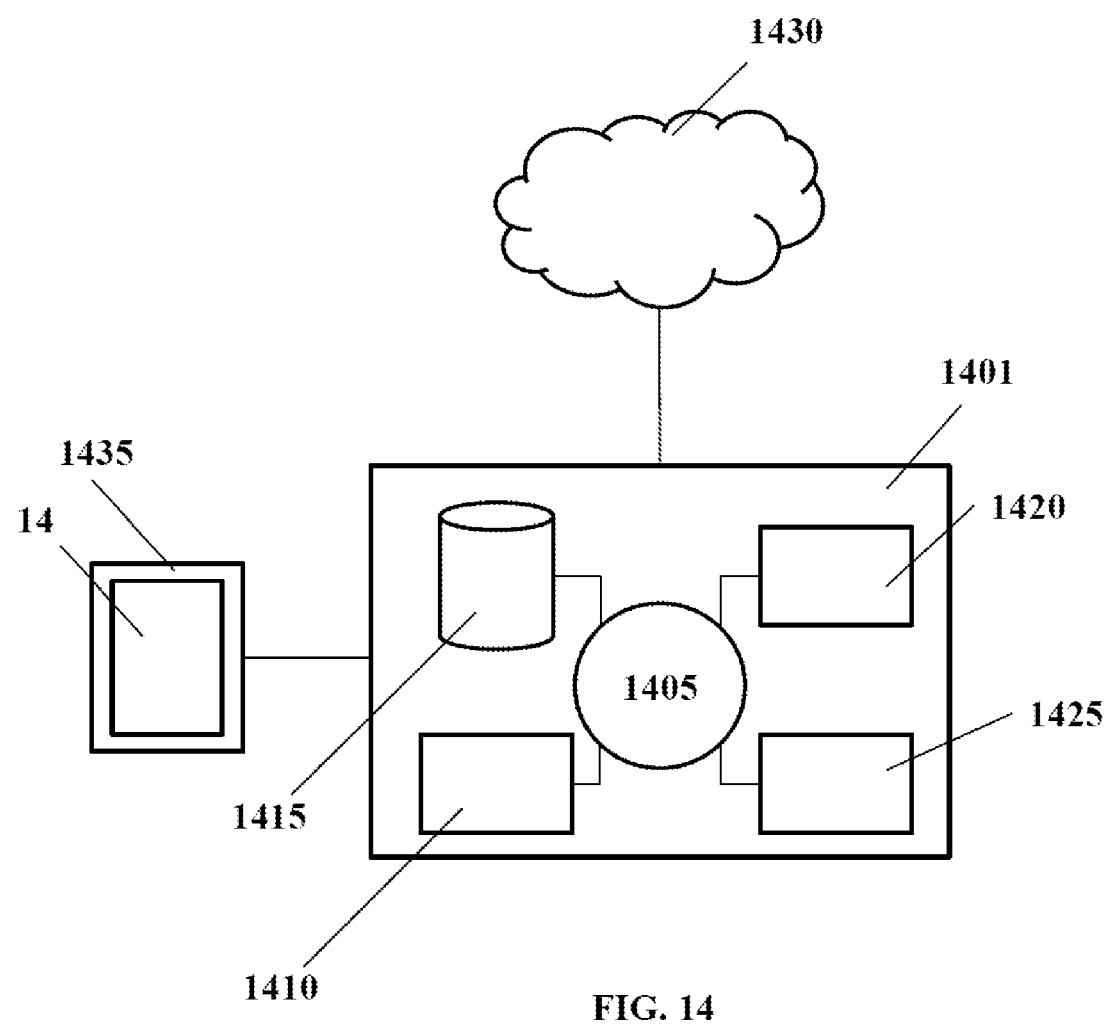
FIG. 14 shows a computer system that is programmed or otherwise configured to apply a search path to various data models regardless of contexts.

The present disclosure provides computer systems that are programmed to implement methods of the disclosure. FIG. 14 shows a computer system 1401 that is programmed or otherwise configured to apply a search path to various data models regardless of contexts. The computer system 1401 can regulate various aspects of visualization, queries and graph analysis of the present disclosure, such as, for example, creating domain ontology for an existing data model, translating a search path into semantic format, applying a semantic form search path to various data models. The computer system 1401 can be an electronic device of a user or a computer system that is remotely located with respect to the electronic device. The electronic device can be a mobile electronic device.

The computer system 1401 includes a central processing unit (CPU, also "processor" and "computer processor" herein) 1405, which can be a single core or multi core processor, or a plurality of processors for parallel processing. The computer system 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 can be a data storage unit (or data repository) for storing data. The computer system 1401 can be operatively coupled to a computer network ("network") 1430 with the aid of the communication interface 1420. The network 1430 can be the Internet, an internet and/or extranet, or an intranet and/or extranet that is in communication with the Internet. The network 1430 in some cases is a telecommunication and/or data network. The network 1430 can include one or more computer servers, which can enable distributed computing, such as cloud computing. The network 1430, in some cases with the aid of the computer system 1401, can implement a peer-to-peer network, which may enable devices coupled to the computer system 1401 to behave as a client or a server.

The CPU 1405 can execute a sequence of machine-readable instructions, which can be embodied in a program or software. The instructions may be stored in a memory location, such as the memory 1410. The instructions can be directed to the CPU 1405, which can subsequently program or otherwise configure the CPU 1405 to implement methods of the present disclosure. Examples of operations performed by the CPU 1405 can include fetch, decode, execute, and writeback.

The CPU 1405 can be part of a circuit, such as an integrated circuit. One or more other components of the system 1401 can be included in the circuit. In some cases, the circuit is an application specific integrated circuit (ASIC).

The storage unit 1415 can store files, such as drivers, libraries and saved programs. The storage unit 1415 can store user data, e.g., user preferences and user programs. The computer system 1401 in some cases can include one or more additional data storage units that are external to the computer system 1401, such as located on a remote server that is in communication with the computer system 1401 through an intranet or the Internet.

The computer system 1401 can communicate with one or more remote computer systems through the network 1430. For instance, the computer system 1401 can communicate with a remote computer system of a user (e.g., a web server, a database server). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1401 via the network 1430.

Methods as described herein can be implemented by way of machine (e.g., computer processor) executable code stored on an electronic storage location of the computer system 1401, such as, for example, on the memory 1410 or electronic storage unit 1415. The machine executable or machine readable code can be provided in the form of software. During use, the code can be executed by the processor 1405. In some cases, the code can be retrieved from the storage unit 1415 and stored on the memory 1410 for ready access by the processor 1405. In some situations, the electronic storage unit 1415 can be precluded, and machine-executable instructions are stored on memory 1410.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1401 can include or be in communication with an electronic display 1435 that comprises a user interface (UI) 1440 for providing, for example, visualization. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1405.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for querying a database comprising:
   (a) executing a database query, in response to receiving a request via a graphical user interface (GUI) from a user, by finding all paths from a source vertex to a target vertex in a graph, wherein the source vertex and the target vertex represent a source data object and a target data object stored in the database, wherein the database is configured to store a plurality of data objects in a non-hierarchical structure, wherein the non-hierarchical structure comprises at least a definition of a dataset structure and a definition of a data object structure and wherein a vertex in the graph represents a data object stored in the database;
(b) generating a metadata graph for reducing the graph, wherein the metadata graph comprises a plurality of reduced vertices each representing a dataset that one or more data objects belong to, wherein the dataset is stored by the dataset structure in the database, and wherein a source reduced vertex from the plurality of reduced vertices represents a dataset that the source vertex belongs to;
(c) in the metadata graph, filtering one or more edge types that connect the source reduced vertex to one or more neighbor reduced vertices, to generate one or more filtered edge types based at least in part on a predetermined maximum length, wherein
a path length from each of the one or more neighbor reduced vertices of the one or more filtered edge types to the target reduced vertex, containing the target vertex, is no greater than a predetermined maximum length, and
a neighbor of a given vertex is another vertex being connected to the given vertex with a single edge;
(d) in the graph, identifying, if any, one or more vertices in the datasets represented by the one or more neighbor reduced vertices connected by the one or more filtered edge types in (c) intersect with the target vertex and saving, in a memory associated with the database, the identified one or more vertices;
(e) reducing the predetermined distance and updating the source vertex, and iterating (c)-(d) until the predetermined distance is reduced to zero; and
(f) returning, via the GUI to the user, at least one path from the source vertex to the target vertex, wherein the at least one path comprises a sequence of two or more vertices identified in (c)-(e).

2. The computer-implemented method of claim 1, wherein a target reduced vertex from the plurality of reduced vertices represents a dataset that the target vertex belongs to.

3. The computer-implemented method of claim 1, wherein the updating of the source vertex comprises setting at least one of the one or more vertices as the source vertex upon determining that the at least one vertex does not intersect with the target vertex.

4. The computer-implemented method of claim 1, further comprising updating the source reduced vertex or the target reduced vertex.

5. The computer-implemented method of claim 4, wherein the source reduced vertex and the target reduced vertex are updated substantially simultaneously or in an alternating fashion.

6. The computer-implemented method of claim 1, wherein the metadata graph is generated based at least in part on metadata describing the plurality of data objects and one or more datasets that the plurality of data objects belong to.

7. The computer-implemented method of claim 6, wherein the metadata further describes the one or more edge types.

8. The computer-implemented method of claim 7, wherein each edge type defines a relation between two data sets datasets.

9. The computer-implemented method of claim 7, wherein the metadata comprises entity class, relation between entity classes, or attributes of entity class stored in the non-hierarchical structure comprising a plurality of defined fixed data structures.

10. A non-transitory computer-readable medium comprising machine-executable code that, upon execution by one or more computer processors, implements a method for querying a database comprising:
(a) executing a database query, in response to receiving a request via a graphical user interface (GUI) from a user, by finding all paths from a source vertex to a target vertex in a graph, wherein the source vertex and the target vertex represent a source data object and a target data object stored in the database, wherein the database is configured to store a plurality of data objects in anon-hierarchical structure, wherein the non-hierarchical structure comprises at least a definition of a dataset structure and a definition of a data object structure and wherein a vertex in the graph represents a data object stored in the database;
(b) generating a metadata graph for reducing the graph, wherein the metadata graph comprises a plurality of reduced vertices each representing a dataset that one or more data objects belong to, wherein the dataset is stored by the dataset structure in the database and wherein a source reduced vertex from the plurality of reduced vertices represents a dataset that the source vertex belongs to;
(c) in the metadata graph, filtering one or more edge types that connect the source reduced vertex to one or more neighbor reduced vertices, to generate one or more filtered edge types based at least in part on a predetermined maximum length, wherein
a path length from each of the one or more neighbor reduced vertices of the one or more filtered edge types to the target reduced vertex, containing the target vertex, is no greater than a predetermined maximum length, and
a neighbor of a given vertex is another vertex being connected to the given vertex with a single edge;
(d) in the graph, identifying, if any, one or more vertices in the datasets represented by the one or more neighbor reduced vertices connected by the one or more filtered edge types in (c) intersect with the target vertex and saving the identified one or more vertices;
(e) reducing the predetermined distance and updating the source vertex, and iterating (c)-(d) until the predetermined distance is reduced to zero; and
(f) returning, via the GUI to the user, at least one path from the source vertex to the target vertex, wherein the at least one path comprises a sequence of two or more vertices identified in (c)-(e).

11. The non-transitory computer-readable medium of claim 10, wherein a target reduced vertex from the plurality of reduced vertices represents a dataset that the target vertex belongs to.

12. The non-transitory computer-readable medium of claim 10, wherein updating the source vertex comprises setting at least one of the one or more vertices as the source vertex upon determining that the at least one vertex does not intersect with the target vertex.

13. The non-transitory computer-readable medium of claim 10, wherein the method further comprises updating the source reduced vertex or the target reduced vertex.

14. The non-transitory computer-readable medium of claim 13, wherein the source reduced vertex and the target reduced vertex are updated substantially simultaneously or in an alternating fashion.

15. The non-transitory computer-readable medium of claim 10, wherein the metadata graph is generated based at least in part on metadata describing the plurality of data objects and one or more datasets that the plurality of data objects belong to.

16. A computer system comprising at least one hardware processor and memory for querying a database comprising:
(a) executing a database query, in response to receiving a request via a graphical user interface (GUI) from a user, by finding all paths from a source vertex to a target vertex in a graph, wherein the source vertex and the target vertex represent a source data object and a target data object stored in the database, wherein the database is configured to store a plurality of data objects in a non-hierarchical structure, wherein the non-hierarchical structure comprises at least a definition of a dataset structure and a definition of a data object structure;
(b) generating a metadata graph by reducing the graph, wherein the metadata graph is generated based on metadata describing the plurality of vertices and one or more edges of the graph, wherein the metadata graph comprises one or more edge types and one or more reduced vertices, and wherein a vertex in the graph represents a data object stored in the database and wherein a reduced vertex in the metadata graph represents a dataset stored in the database;
(c) calculating lengths for one or more paths between the one or more reduced vertices of the metadata graph;
(d) filtering the one or more edge types of the metadata graph based on a source vertex, a target vertex, and a predetermined maximum length, to generate one or more filtered edge types connecting a source reduced vertex, containing the source vertex, to one or more neighbor reduced vertices, wherein
a path length from each of the one or more neighbor reduced vertices of the one or more filtered edge types to a target reduced vertex, containing the target vertex, is no greater than the predetermined maximum length, and
a neighbor of a given vertex is another vertex being connected to the given vertex with a single edge;
(e) identifying one or more vertices, if any, of the one or more neighbor reduced vertices identified in (d) intersecting with the target vertex and saving, in the memory, the identified one or more vertices;
(f) decreasing the predetermined maximum length and repeating (d) and (e) until the maximum length is equal to zero; and
(g) returning, via the GUI to the user, at least one path from the source vertex to the target vertex, wherein the at least one path comprises a sequence of two or more vertices identified in (d)-(f).

17. The computer system of claim 16, wherein the non-hierarchical structure further comprises defined fixed data structures defining relations between datasets.

18. The computer system of claim 16, wherein the metadata includes an edge type of the one or more edge types and a dataset that a vertex of the one or more vertices belongs to.

19. The computer system of claim 16, wherein the edge type defines a relation between two datasets.

20. The computer system of claim 17, wherein the metadata comprises entity class, relation between entity classes, or attributes of entity class stored in the defined fixed data structures.

* * * * *